(12) United States Patent
Rabii

(10) Patent No.: US 9,226,069 B2
(45) Date of Patent: Dec. 29, 2015

(54) TRANSITIONING MULTIPLE MICROPHONES FROM A FIRST MODE TO A SECOND MODE

(75) Inventor: Khosro M. Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 13/079,064

(22) Filed: Apr. 4, 2011

(65) Prior Publication Data

US 2012/0106754 A1 May 3, 2012

Related U.S. Application Data

(60) Provisional application No. 61/408,434, filed on Oct. 29, 2010.

(51) Int. Cl.
| | |
|---|---|
| *H04R 3/00* | (2006.01) |
| *H04R 29/00* | (2006.01) |
| *H02B 1/00* | (2006.01) |
| *G01S 15/00* | (2006.01) |
| *G01S 15/87* | (2006.01) |

(52) U.S. Cl.
CPC .............. *H04R 3/005* (2013.01); *G01S 15/003* (2013.01); *G01S 15/876* (2013.01); *H04R 29/005* (2013.01); *H04R 2499/11* (2013.01)

(58) Field of Classification Search
CPC ...... H04R 3/005; H04R 1/406; H04R 25/407; H04R 1/326; H04R 29/00; H04R 2499/11; G01S 15/003; G01S 15/879
USPC ...................................... 381/92, 123, 56, 122
See application file for complete search history.

(56) References Cited

U.S. PATENT DOCUMENTS

| 8,077,163 | B2 | 12/2011 | Qi | |
|---|---|---|---|---|
| 2002/0167862 | A1 | 11/2002 | Tomasi et al. | |
| 2002/0181723 | A1 | 12/2002 | Kataoka | |
| 2003/0133582 | A1 | 7/2003 | Niederdrank et al. | |
| 2003/0138119 | A1* | 7/2003 | Pocino et al. | 381/119 |
| 2003/0151596 | A1 | 8/2003 | Moyne et al. | |
| 2004/0175008 | A1 | 9/2004 | Roeck et al. | |
| 2007/0149246 | A1 | 6/2007 | Bodley et al. | |

FOREIGN PATENT DOCUMENTS

| CN | 101640829 A | 2/2010 |
|---|---|---|
| EP | 1460769 | 9/2004 |
| JP | H0667793 A | 3/1994 |
| JP | 2001125727 A | 5/2001 |
| JP | 2002366191 A | 12/2002 |
| JP | 2006323823 A | 11/2006 |
| JP | 2009199158 A | 9/2009 |
| WO | WO2006070044 A1 | 7/2006 |
| WO | 2008024988 A2 | 2/2008 |

OTHER PUBLICATIONS

International Search Report and Written Opinion—PCT/US2011/058146—ISA/EPO—Jul. 3, 2012.

\* cited by examiner

*Primary Examiner* — Vivian Chin
*Assistant Examiner* — Douglas Suthers
(74) *Attorney, Agent, or Firm* — Rupit M. Patel

(57) ABSTRACT

An apparatus includes multiple microphones and a controller. The controller is coupled to receive a signal from each of the multiple microphones. The controller is configured to control a transition of the multiple microphones from an active mode to a dormant mode. When the multiple microphones are in the active mode, the controller is configured to perform signal processing responsive to signals received from at least two of the multiple microphones. When the multiple microphones are in the dormant mode, the controller is configured to select a microphone of the multiple microphones and to perform signal processing corresponding to the selected microphone while suspending signal processing corresponding to unselected microphones.

50 Claims, 9 Drawing Sheets

TRANSITIONING MULTIPLE MICROPHONES FROM A FIRST MODE TO A SECOND MODE

RELATED APPLICATIONS

The present Application for Patent claims priority to Provisional Application No. 61/408,434 entitled "TRANSITIONING MULTIPLE MICROPHONES FROM A FIRST MODE TO A SECOND MODE" filed Oct. 29, 2010, and assigned to the assignee hereof.

FIELD

The present disclosure is generally related to transitioning multiple microphones from a first mode to a second mode.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, an audio file player, and input/output devices such as a touch screen display, microphones, and speakers.

The portable personal computing devices may include multiple microphones to perform various functions, such as receiving audio signals. The multiple microphones may consume power from a power source, such as a battery.

SUMMARY

A controller may receive signals from multiple microphones. The controller may control a transition of each of the microphones from an active mode to a dormant mode. When the microphones are in the active mode, the controller may perform signal processing corresponding to two or more of the microphones. When the microphones are in the dormant mode, the controller may select a microphone and perform signal processing corresponding to the selected microphone while suspending signal processing corresponding to unselected microphones. The microphones may consume less power in the dormant mode than in the active mode.

In a particular embodiment, an apparatus includes multiple microphones and a controller. The controller is coupled to receive a signal from each of the multiple microphones. The controller is configured to control a transition of the multiple microphones from an active mode to a dormant mode. When the multiple microphones are in the active mode, the controller is configured to perform signal processing responsive to signals received from at least two of the multiple microphones. When the multiple microphones are in the dormant mode, the controller is configured to select a subset of the multiple microphones and to perform signal processing corresponding to the selected subset of microphones while suspending signal processing corresponding to unselected microphones.

In another particular embodiment, an apparatus includes an array of microphones and a controller. The controller is coupled to receive a signal from each microphone of the array of microphones. The controller is configured to control a transition of the array of microphones from an active mode to a dormant mode. The controller is also configured to perform signal processing of the signals received from each microphone, to detect an event, and to pre-qualify the event prior to sending an interrupt to an application processor.

In another particular embodiment, when the array of microphones is in the active mode, the controller is configured to process the received signals to perform gesture recognition.

In another particular embodiment, a method includes receiving a signal at a controller from at least one microphone of a plurality of microphones. The controller is configured to transition the plurality of microphones from an active mode to a dormant mode. When the plurality of microphones are in the active mode, the method includes processing signals from each of the microphones. When the plurality of microphones are in the dormant mode, the method includes selecting a subset of microphones from the plurality of microphones and processing signals corresponding to the selected microphones while suspending processing of signals corresponding to unselected microphones of the plurality of microphones.

Particular advantages provided by at least one of the disclosed embodiments include reducing power consumption of the plurality of microphones by transitioning the plurality of microphones from an active mode to a dormant mode.

Other aspects, advantages, and features of the present disclosure will become apparent after review of the entire application, including the following sections: Brief Description of the Drawings, Detailed Description, and the Claims.

DETAILED DESCRIPTION

Figure 1:
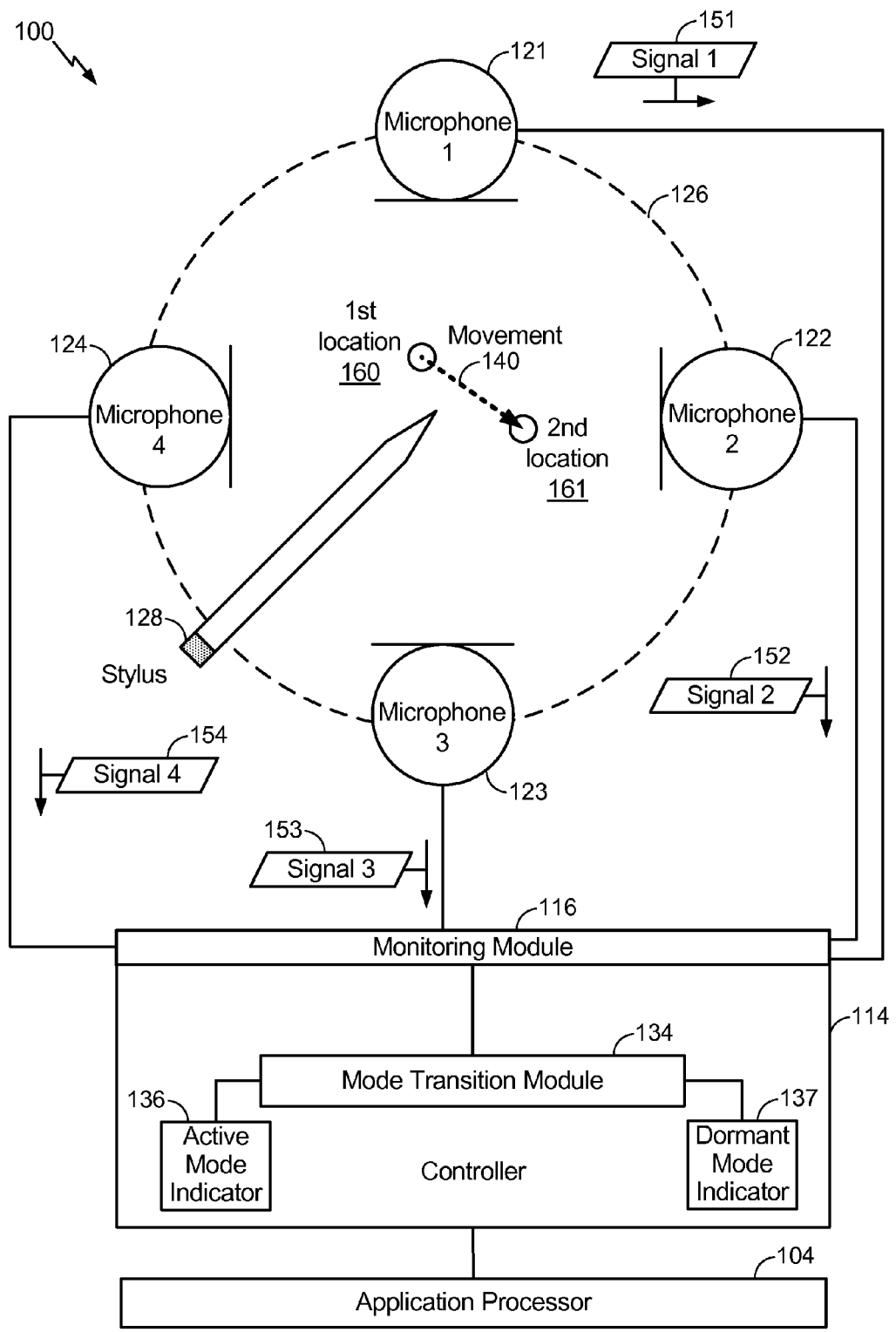
FIG. 1 is a diagram of a first embodiment of an apparatus to control monitoring of multiple microphones.

Referring to FIG. 1, a block diagram of a first embodiment of an apparatus to control monitoring of multiple microphones is depicted and designated 100. The apparatus 100 includes a controller 114 that is coupled to a plurality of microphones including a first microphone 121, a second microphone 122, a third microphone 123, and a fourth microphone 124. The microphones 121-124 may be arranged to detect audio activity resulting from movement in a zone 126 and to generate electrical signals 151-154 corresponding to the audio activity. The microphones 121-124 may be arranged in an outline of a geometric shape, such as a square, a circle, a rectangle, a rhombus, other geometric shape, or any combination thereof. The controller 114 is coupled to an application processor 104. The controller 114 may receive a first signal 151 from the first microphone 121, a second signal 152 from the second microphone 122, a third signal 153 from the third microphone 123, and a fourth signal 154 from the fourth microphone 154. The controller 114 may control a transition of the microphones 121-124 from an active mode to a dormant mode based on the signals 151-154. For example, when the controller 114 does not receive any of the signals 151-154 from the microphones 121-124 for a predetermined period of time, the controller 114 may transition to a dormant mode. In the dormant mode, less than all of the microphones 121-124 may be used to detect movement in the zone 126 to reduce power consumption of the microphones 121-124. In the dormant mode, when the controller 114 detects movement in the zone 126, the controller 114 may transition the microphones 121-124 to the active mode.

The controller 114 includes a monitoring module 116, a mode transition module 134, an active mode indicator 136, and a dormant mode indicator 137. The active mode indicator 136 may be used to indicate when the microphones 121-124 are in the active mode. The dormant mode indicator 137 may be used to indicate when all the microphones 121-124 are in the dormant mode. The monitoring module 116 may monitor the signals 151-154 received from the microphones 121-124 and indicate to the mode transition module 134 when any of the microphones 121-124 receive sound waves (not shown) generated by a movement 140 of an object within the zone 126. The mode transition module 134 may determine whether to transition the microphones 121-124 from the active mode to the dormant mode or from the dormant mode to the active mode based on whether the microphones 121-124 detect the sound waves generated by the movement 140.

The application processor 104 may be used (e.g., in a computing device) to perform various functions, such as receiving user input and performing actions based on the user input. The application processor 104 may include an operating system that is capable of providing a graphical user interface.

The controller 114 may use an echolocation algorithm to determine locations of objects in the zone 126. Echolocation uses echoes of a sound generated by the movement 140 to locate objects in the zone 126 using the multiple microphones 121-124. For example, the controller 114 may measure the time delay between microphone signals that are generated in response to sound waves generated by the movement 140 and any echoes. The signals 151-154 may correspond to the relative intensity of the sounds received at the microphones 121-124. Echoes may be received by the microphones 121-124 at different times and at different loudness levels, depending on the position of the object (e.g., a stylus 128 or a finger of a user) that generates the echoes. An echolocation algorithm may use the time and loudness differences to determine a location and a direction of the object. For example, the echolocation algorithm may determine that the stylus 128 is closer to the microphone 124 than the other microphones 121-123 when the signal 154 generated by the microphone 124 in response to movement from the stylus 128 has an amplitude that is greater than the amplitude of the signals 151-153. The echolocation algorithm may determine that the stylus 128 is closer to the microphone 124 than the other microphones 121-123 when the signal 154 generated by the microphone 124 in response to movement from the stylus 128 is received by the monitoring module 116 before the signals 151-153 are received.

In operation, the microphones 121-124 may initially be in the active mode. While the microphones 121-124 are in the active mode, the monitoring module 116 may process two or more of the signals 151-154 from the microphones 121-124. In a particular embodiment, all of the signals 151-154 are processed concurrently in the active mode. The microphones 121-124 may generate the signals 151-154 in response to receiving sound waves generated by the movement 140 of an input device, such as a stylus 128. For example, the microphones 121-124 may determine a first location 160 of a portion of the stylus 128 (e.g., a tip of the stylus 128) at a first time by determining a first distance between the first location 160 and at least one of the microphones 121-124. The microphones 121-124 may determine a second location 161 of the tip of the stylus at a second time by determining a second distance between the second location 161 and at least one of the microphones 121-124. The monitoring module 116 may receive the signals 151-154 generated by the microphones 121-124 based on the detected movement 140, e.g., when the tip of the stylus moves from the first location 160 to the second location 161.

The monitoring module 116 may determine that the microphones 121-124 are not detecting any movement when the monitoring module 116 does not receive the signals 151-154 within a predetermined period of time. The monitoring module 116 may notify the mode transition module 134 that the microphones 121-124 have not detected any movement for the predetermined period of time. In response, the mode transition module 134 may transition the microphones 121-124 from the active mode to the dormant mode to reduce power consumption of the microphones 121-124. After the transition from the active mode to the dormant mode, the mode transition module 134 may activate the dormant mode indicator 137 and deactivate the active mode indicator 136.

In the dormant mode, the microphones 121-124 consume less power than when in the active mode. In the dormant mode, the monitoring module 116 may monitor one or more, but not all, of the microphones 121-124. For example, the monitoring module 116 may selectively activate each of the microphones 121-124 in turn. To illustrate, in the dormant mode, the monitoring module 116 may activate and monitor the first microphone 121 while suspending monitoring of the other microphones 122-124. After a period of time has elapsed, the monitoring module may activate and monitor the second microphone 122 while suspending monitoring of the other microphones 121 and 123-124. Selective monitoring continues for the third microphone 123 and the fourth microphone 124 and then returns to the first microphone 121. In this manner, each of the microphones 121-124 may be sequentially activated. As an alternative to sequential activation, the monitoring module 116 may use other activation patterns, such as random activation or another predefined pattern.

The microphones 121-124 may be transitioned from the dormant mode to the active mode to receive input from a user (e.g., via the stylus 128). In the dormant mode, when the monitoring module 116 determines that at least one of the microphones 121-124 has detected sound waves generated by the movement 140, the monitoring module 116 may inform the mode transition module 134 of the detected movement 140 so that the mode transition module 134 may transition the microphones 121-124 from the dormant mode to the active mode. For example, in the dormant mode, the monitoring module 116 may receive one of the signals 151-154 when monitoring one of the microphones 121-124. The received signal may indicate that one of the microphones 121-124 has detected movement, such as the movement 140 generated by the stylus 128. In response to the notification of the detected movement 140, the mode transition module 134 may transition the microphones 121-124 from the dormant mode to the active mode, and the mode transition module 134 may deactivate the dormant mode indicator 137 and activate the active mode indicator 136.

Thus, transitioning the microphones 121-124 from the active mode to the dormant mode can reduce power consumption of the microphones 121-124. The power consumption of the microphones 121-124 may be reduced in the dormant mode because fewer microphones 121-124 are actively monitored in the dormant mode than in the active mode. For example, when the monitoring module 116 activates a single microphone of the multiple microphones 121-124 at a time in the dormant mode, the power consumption of the microphones 121-124 can be reduced by approximately seventy-five percent as compared to when all of the microphones 121-124 are in the active mode.

Figure 2:
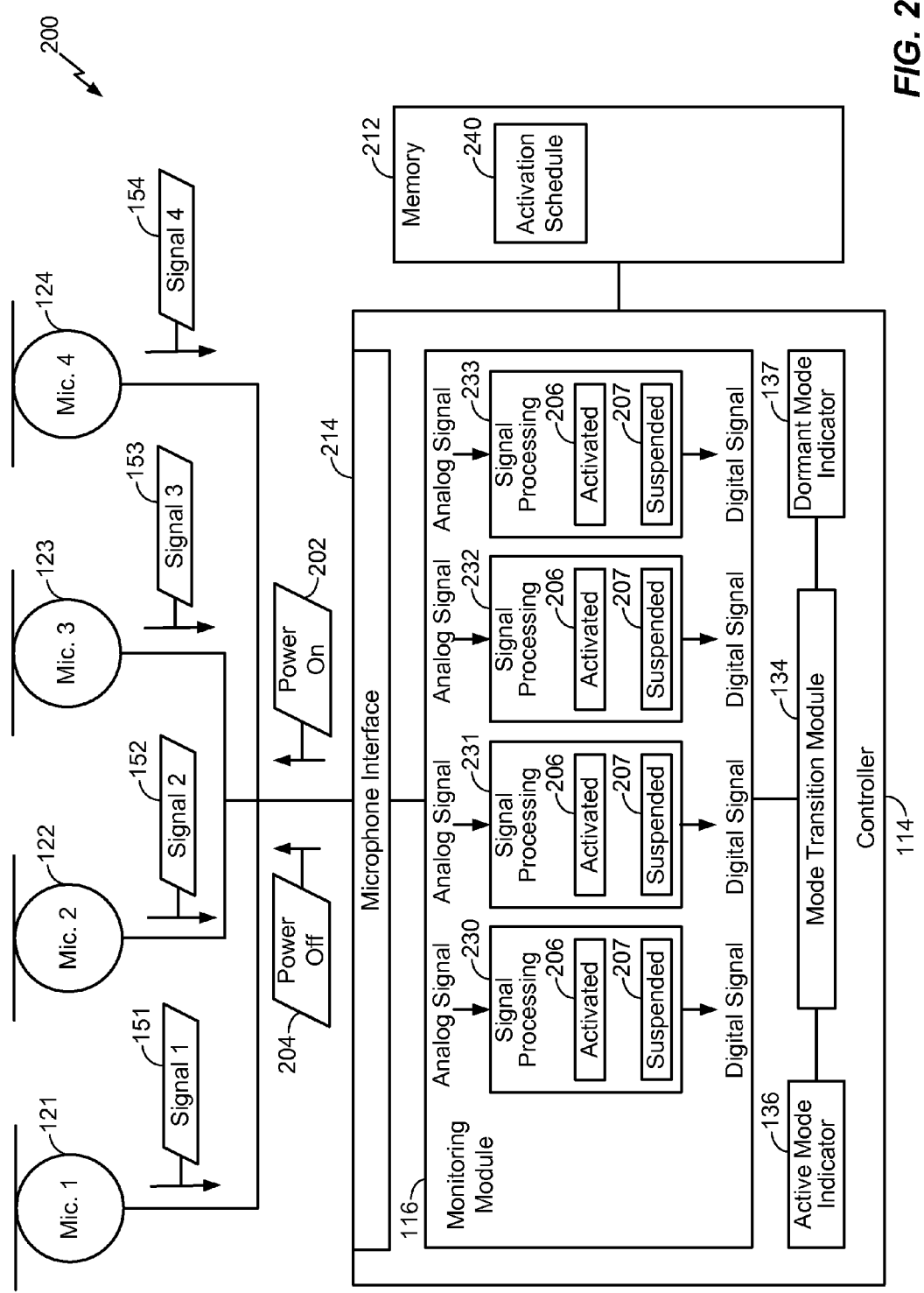
FIG. 2 is a diagram of a second embodiment of an apparatus to control monitoring of multiple microphones.

Referring to FIG. 2, a diagram of a second embodiment of an apparatus to control monitoring of multiple microphones is depicted and designated 200. In the apparatus 200, the controller 114 is coupled to the microphones 121-124 to receive the signals 151-154. The controller 114 may control the transition of the microphones 121-124 from a first mode to a second mode, such as from the active mode to the dormant mode or from the dormant mode to the active mode. The controller 114 may be coupled to a memory 212. In FIG. 2, the microphones 121-124 are depicted in a straight line for ease of illustration. In a particular embodiment, the microphones 121-124 may be arranged in a particular pattern or geometric shape (i.e., triangle, rectangle, circle, etc.).

The controller 114 may include a microphone interface 214 to receive the signals 151-154 from the microphones 121-124. The monitoring module 116 of the controller 114 may perform signal processing responsive to received electrical signals 151-154 from at least two of the microphones 121-124 by use of signal processing elements 230-233. For example, the signal processing element 230 may process the first signal 151 concurrently with the signal processing element 231 processing the second signal 152, the signal processing element 232 processing the third signal 153, and the signal processing element 233 processing the fourth signal 154.

The signal processing elements 230-233 may receive analog signals 151-154 from the microphones 121-124 via the microphone interface 214 and convert the analog signals 151-154 to digital signals. Each of the signal processing elements 230-233 may be in an activated mode 206 or a suspended mode 207.

In operation, each of the signal processing elements 230-233 may initially be in the activated mode 206. The microphones 121-124 may generate the signals 151-154 in response to detecting sound waves generated by movement of an input device, such as the stylus 128 of FIG. 1. When the monitoring module 116 determines that the microphones 121-124 have not detected any sound waves (i.e., no movement) for a particular period of time, the monitoring module 116 may inform the mode transition module 134 that no sound waves have been detected. In response, the mode transition module 134 may transition the microphones 121-124 from the active mode to the dormant mode.

In a particular embodiment, when transitioning from the active mode to the dormant mode, the mode transition module 134 may progressively place each of the signal processing elements 230-233 in the suspended mode 207. When transitioning from the active mode to the dormant mode, the mode transition module 134 may incrementally place signal processing elements 230-233 into the suspended mode to gradually transition from the active module to the dormant mode. For example, the mode transition module 134 may place the signal processing element 230 in the suspended mode 207 while the signal processing elements 231-233 are in the activated mode 206. The mode transition module 134 may place the signal processing elements 230-231 in the suspended mode 207 while the signal processing elements 232-233 are in the activated mode 206. The mode transition module 134 may place the signal processing elements 230-232 in the suspended mode 207 while the signal processing element 233 is in the activated mode 206. The mode transition module 134 may place the signal processing elements 230-233 in the suspended mode 207 to complete the transition to dormant mode.

In the dormant mode, the mode transition module 134 may periodically, based on an activation schedule 240 that is stored at the memory 212, place one or more of the signal processing elements 230-233 into the activated mode 206. For example, the mode transition module 134 may place the signal processing element 230 in the activated mode 206 for a first time period (e.g., one second) while the signal processing elements 231-233 are in the suspended mode 207. The mode transition module 134 may place the signal processing element 231 in the activated mode 206 for a second time period (e.g., one second) and place the signal processing elements 230 and 232-233 in the suspended mode 207. Thus, the mode transition module 134 may use the activation schedule 240 to periodically place one or more of the signal processing elements 230-233 in the activated mode 206 while placing the remaining signal processing elements 230-233 in the suspended mode 207. The signal processing elements 230-233 may be periodically placed in the activated mode 206 for a particular time period, such as a few hundred milliseconds, a few seconds, or a few minutes at a time according to the activation schedule 240.

In the dormant mode, when the monitoring module 116 receives one or more of the signals 151-154 (i.e., the signals 151-154 are generated in response to the movement 140), the mode transition module 134 may transition from the dormant mode to the active mode. When transitioning from the dormant mode to the active mode, the mode transition module 134 may progressively place each of the signal processing elements 230-233 in the activated mode 206.

In another particular embodiment, when transitioning from the active mode to the dormant mode, the controller 114 may send a power off command 204 to one or more of the microphones 121-124. For example, when transitioning from the active mode to the dormant mode, after a first particular period of time during which signals 151-154 are not received from the microphones 121-124, the controller 114 may send the power off command 204 to the first microphone 121. After a second particular period of time during which signals 152-154 are not received from the microphones 122-124, the controller 114 may send the power off command 204 to the second microphone 122. After a third particular period of time during which signals 153-154 are not received from the microphones 123-124, the controller 114 may send the power off command 204 to the third microphone 123. After a fourth particular period of time during which the signal 154 is not received from the microphone 124, the controller 114 may send the power off command 204 to the fourth microphone 124. In this way, the controller 114 may incrementally and gradually transition the microphones 121-124 from the active mode to the dormant mode. Alternately, the controller 114 may send the power off command 204 to all of the microphones 121-124 concurrently to quickly transition the microphones 121-124 from the active mode to the dormant mode.

In the dormant mode, the controller 114 may periodically send the power on command 202 to one or more of the microphones 121-124 while sending the power off command 204 to the remaining microphones. For example, in the dormant mode, the controller 114 may, based on the activation schedule 240, send a power on command 202 to one or more of the microphones 121-124. To illustrate, the controller 114 may send the power on command 202 to the first microphone 121 to determine whether the first microphone 121 is sending the first signal 151. After a particular period of time has passed during which the controller 114 does not receive the first signal 151 from the microphone 121, the controller 114 may send the power off command 204 to the first microphone 121 and send the power on command 202 to one of the microphones 122-124. Thus, in the dormant mode, the controller 114 may individually power on and power off each of the microphones 121-124 based on the activation schedule 240. Alternately, in the dormant mode, the controller 114 may power on and power off two of the microphones 121-124 based on the activation schedule 240.

In the dormant mode, when the monitoring module 116 detects movement based on at least one of the signals 151-154, the mode transition module 134 may transition from the dormant mode to the active mode by sending the power on command 202 to each of the microphones 121-124. The power on command 202 may be sent to each of the microphones 121-124 simultaneously, sequentially, or randomly.

Thus, by transitioning from the active mode to the dormant mode, the mode transition module 134 can reduce power consumption of the microphones 121-124, the signal processing elements 230-233, or both. The power consumption of the microphones 121-124 may be reduced in the dormant mode by sending the power off command 204 to all the microphones 121-124 and periodically sending the power on command to less than all of the microphones 121-124 according to the activation schedule 240. In the dormant mode, the power consumption of the signal processing elements 230-233 may be reduced by placing all of the signal processing elements 230-233 in the suspended mode 207 and periodically placing one or more of the signal processing elements 230-233 in the activated mode 206 according to the activation schedule 240. Thus, the controller 114 may power off one or more of the microphones 121-124 to transition to the dormant mode and selectively activate each of the microphones 121-124 according to the activation schedule 240.

Figure 3:
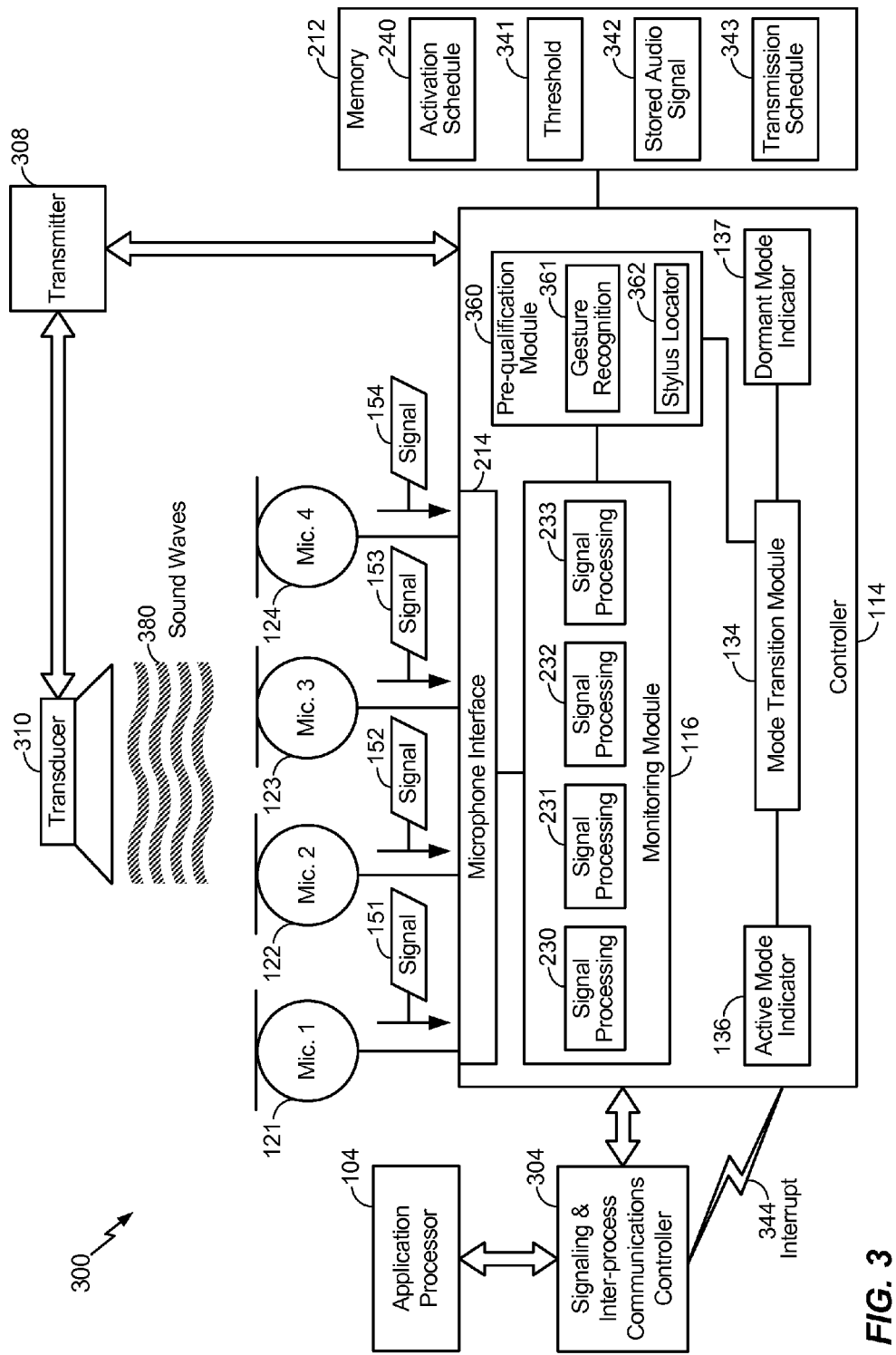
FIG. 3 is a diagram of a third embodiment of an apparatus to control monitoring of multiple microphones.

Referring to FIG. 3, a block diagram of a third embodiment of an apparatus to control monitoring of multiple microphones is depicted and generally designated 300. In the apparatus 300, the controller 114 is coupled to receive signals 151-154 from each of the microphones 121-124 and to control a transition of the microphones 121-124 from the active mode to the dormant mode. In FIG. 3, the microphones 121-124 are depicted in a straight line for ease of illustration. In a particular embodiment, the microphones 121-124 may be arranged in a particular pattern or geometric shape (i.e., triangle, rectangle, circle, etc.).

The controller 114 is coupled to the application processor 104 via a signaling and inter-process communications controller 304. The signaling and inter-process communications controller 304 may enable the application processor 104 and the controller 114 to send signals to each other (e.g., during inter-process communications). The controller 114 is coupled to the memory 212. The memory 212 may include the activation schedule 240, a threshold 341, a stored audio signal 342, and a transmission schedule 343.

The controller 114 is coupled to a transducer 310 via a transmitter 308. The transmitter 308 may instruct the transducer 310 to emit sound waves 380 that can be received by one or more of the microphones 121-124. The microphones 121-124 may receive the sound waves 380 and generate the signals 151-154. In a particular embodiment, the controller 114 may be a dedicated microphone controller.

The controller 114 may include a prequalification module 360 that includes a gesture recognition module 361 and a stylus locator 362. The prequalification module 360 may receive the output of the signal processing elements 230-233 and determine whether to notify the mode transition module 134 to transition the microphones 121-124 from the active mode to the dormant mode or from the dormant mode to the active mode. For example, when the gesture recognition module 361 recognizes a gesture based on the signal processing elements 230-233, the pre-qualification module 360 may notify the mode transition module 134. A gesture may correspond to movement of an appendage, such as a finger, of a user. The pre-qualification module 360 may notify the mode transition module 134 when the stylus locator module 362 determines a location of a stylus, such as the stylus 128 of FIG. 1. The gesture recognition module 361 may use an echolocation algorithm to identify gestures. The stylus locator module 362 may use an echolocation algorithm to determine a location of a stylus.

The controller 114 may use the signal processing elements 230-233 of the signals 151-154 to detect an event, such as gesture input or stylus input. The pre-qualification module 360 may pre-qualify the event prior to sending an interrupt 344 to the application processor 104. For example, pre-qualifying the event may include comparing a magnitude of one or more of the received signals 151-154 to the threshold 341. To illustrate, when one or more of the received signals 151-154 satisfy the threshold 341, the pre-qualification module 360 may determine that an event has occurred. When none of the received signals 151-154 satisfy the threshold 341, the pre-qualification module 360 may determine that an event has not occurred. Pre-qualifying the event may include detecting a direction of a source of one or more the signals 151-154. For example, the direction of the source of one or more of the signals 151-154 may be performed using echolocation. The pre-qualifying event may include comparing a portion of at least one of the received signals 151-154 to the stored audio signal 342. For example, the stored audio signal 342 may correspond to a waveform of a particular sound made by a stylus on an input surface. As another example, the stored audio signal 342 may be a voice command, such as "power on" or "power off". The pre-qualification module 360 may compare the received signals 151-154 to the stored audio signal 342 to determine whether a user has uttered a voice command and generate the interrupt 344 when the pre-qualification module 360 determines that the received signals 151-154 include the voice command. The controller 114 may be configured to control the transmission schedule 343 of the transmitter 308 during an echolocation operation according to at least one of an expected usage of the apparatus 300 and an elapsed time since a previous triggering event. For example, the transmission schedule 343 may cause the transducer 310 to emit the sound waves 380 at frequent intervals during business hours (e.g., between 7:00 AM to 6:00 PM), at a reduced frequency in the evening (e.g., between 6:00 PM and 11:00 PM), and at a significantly reduced interval during sleeping hours (e.g., between 11:00 PM and 7:00 AM).

In operation, when the microphones 121-124 are in the active mode, the controller 114 may be configured to concurrently use the signal processing elements 230-233 corresponding to each of the multiple microphones 121-124. The monitoring module 116 may monitor two or more of the signals 151-154 that are received from the microphones 121-124. When the monitoring module 116 detects one or more of the signals 151-154, the monitoring module 116 may use the signal processing elements 230-233 and send the result to the pre-qualification module 360. The gesture recognition module 361 may determine whether the result of the signal processing identifies a gesture generated by a user. The stylus locator module 362 may determine a location of a stylus based on the result of the signal processing. When the pre-qualification module 360 determines a lack of gesture input and a lack of movement from the stylus, the pre-qualification module 360 may notify the mode transition module 134. In response, the mode transition module 134 may transition the microphones 121-124 from the active mode to the dormant mode. When transitioning the microphones 121-124 from the active mode to the dormant mode, the controller 114 may be configured to progressively reduce a number of the signals 151-154 that are processed concurrently by the signal processing elements 230-233. For example, in FIG. 3, the controller 114 may reduce the number of the signals 151-154 being concurrently processed from four signals to three signals, from three signals to two signals, and from two signals to one signal. To illustrate, initially, the mode transition module 134 may process the signals 152-154 concurrently while suspending processing of the signal 151. The mode transition module 134 may subsequently process the signals 153-154 concurrently while suspending processing of the signals 151-152. The mode transition module 134 may then process the signals 154 while suspending processing of the signals 151-153.

When the microphones 121-124 are in the dormant mode, the controller 114 may be configured to select at least one of the microphones 121-124 and to perform signal processing corresponding to the selective microphone while suspending signal processing corresponding to unselected microphones. In the dormant mode, the controller 114 may be configured to selectively activate each of the microphones 121-124 according to the activation schedule 340. In the dormant mode, when the pre-qualification module 360 determines that a qualifying event (e.g., gesture input or stylus input) has occurred, the pre-qualification module 360 may notify the mode transition module 134. In response, the mode transition module 134 may transition the microphones 121-124 from the dormant mode to the active mode. The mode transition module 134 may cause the interrupt 344 to be generated to notify the application processor 104 that a qualifying event has occurred.

Thus, the pre-qualification module 360 may determine whether the signals 151-154 indicate a gesture input or stylus movement. When the pre-qualification module 360 detects that there is no gesture input or stylus movement, the mode transition module 134 may transition the microphones 121-124 from the active mode to the dormant mode to reduce power consumption of the microphones 121-124. In the dormant mode, one or more of the microphones 121-124 may be selected and signal processing may be performed for the selected microphone. Thus, the controller 114 may progressively reduce a number of the signals 151-154 that are processed concurrently by the signal processing elements 230-233 when transitioning from the active mode to the dormant mode.

Figure 4:
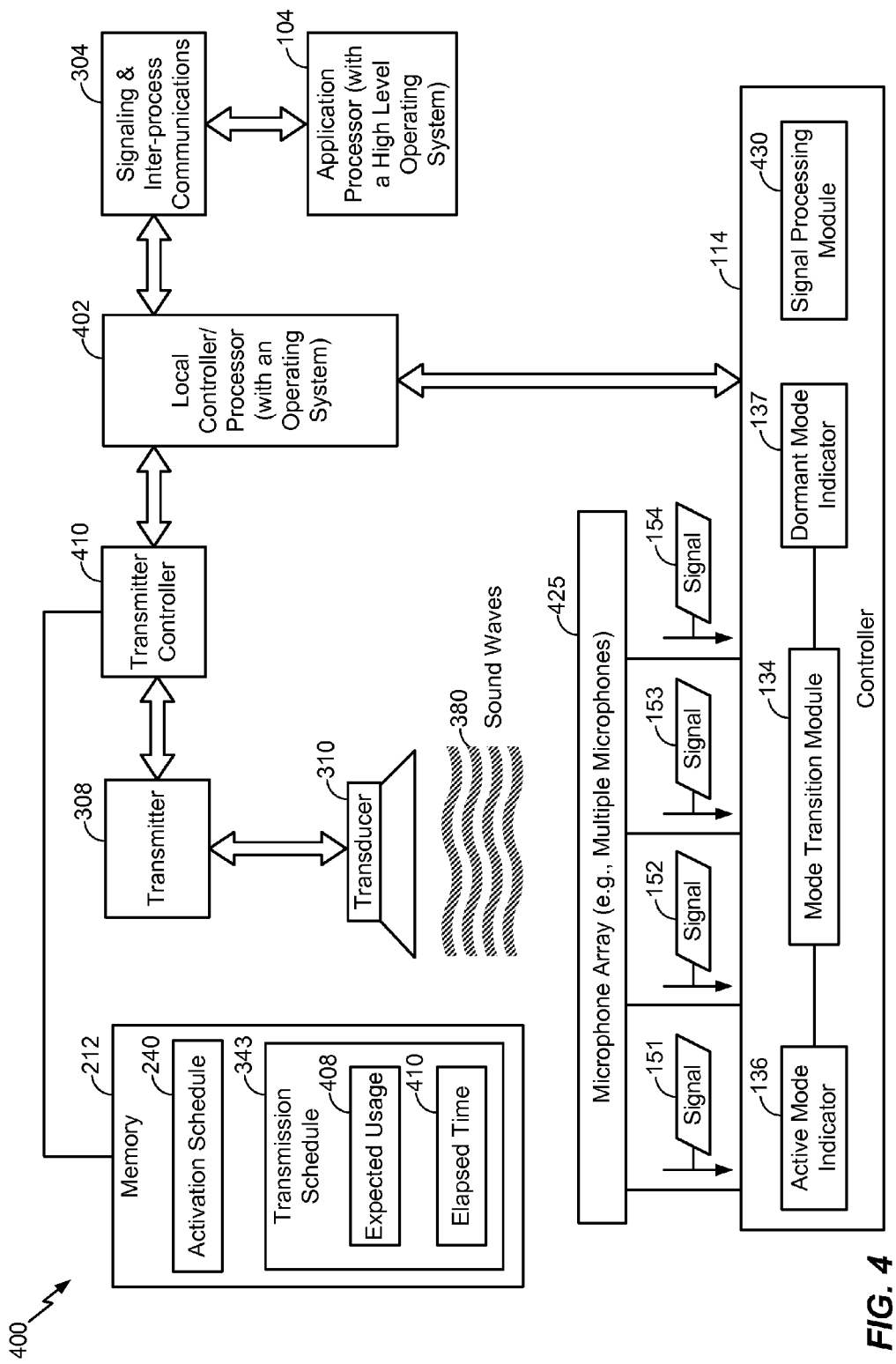
FIG. 4 is a diagram of a fourth embodiment of an apparatus to control monitoring of multiple microphones.

Referring to FIG. 4, a diagram of a fourth embodiment of an apparatus to control monitoring of multiple microphones is depicted and designated 400. In the apparatus 400, the transmitter 308 is coupled to a transmitter controller 410. The transmitter controller 410 is coupled to a local controller/processor 402 and to the memory 212. The local controller/processor 402 may execute an operating system. The local controller/processor 402 may be coupled to the application processor 104 via the signaling and inter-process communications unit 304. In the dormant mode, when the pre-qualification module 360 detects sound waves 380 generated by the movement 140, the mode transition module 134 may transition the microphones 121-124 from the dormant mode to the active mode to receive user input (e.g., via the movement 140). The sound waves 380 may be generated by the transducer 310.

A microphone array 425 including multiple microphones (such as the microphones 121-124) may be coupled to the controller 114. The multiple microphones may be arranged in a particular pattern to detect the movement 140 of the stylus 128 or a movement resulting from a user gesture. The multiple microphones of the microphone array 425 may be arranged in a particular pattern, such as a triangle, a rectangle, a circle, or other shape. The movement 140 from the stylus 128 or from a gesture made by a user may alter the sound waves 380 to enable the microphone array 425 to detect the movement 140. For example, the stylus 128 or a user appendage may block a portion of the sound waves 380 from reaching the microphone array 425. To illustrate, the movement 140 of the stylus 128 may cause reduced amplitude for one or more of the signals 151-154. The controller 114 may detect the movement 140 based on how the movement 140 alters the sound waves 380. As another example, the sound waves 380 may echo off of the stylus 128 or off of a user appendage and enable the controller 114 to detect the movement 140 via an echolocation operation. For example, the controller 114 may detect echoes of the sound waves 380 off of an object in the zone 126 based on processing the signals 151-154.

The controller 114 may include a signal processing module 430 to process the signals 151-154 and to determine whether the signals 151-154 correspond to the movement 140. The controller 114 may analyze the signals 151-154 to detect the movement 140 based on how the movement 140 alters the sound waves 380. For example, when the amplitude of the signal 151 drops from a first level to a second level and then returns to the first level while the amplitude of the signal 152 drops from the first level to the second level, the controller 114 may detect that the movement 140 is from left to right.

In the active mode, when the signal processing module 430 detects lack of the movement 140, the signal processing module 430 may notify the mode transition module 134 to incrementally and gradually transition to the dormant mode. In the dormant mode, when the signal processing module 430 detects the movement 140, the signal processing module 430 may notify the mode transition module 134 to transition to the active mode to receive user input.

In operation, the controller 114 may control a transmission schedule 343 of the transmitter 308 according to at least one of an expected usage 408 of the apparatus 400 and an elapsed time 410 since a previous triggering event. For example, the transmitter controller 410 may cause the transmitter 308 to emit the sound waves 380 via the transducer 310 using the expected usage 408. To illustrate, the sound waves 380 may be emitted at frequent intervals during business hours (e.g., between 7:00 AM to 6:00 PM), at a reduced frequency in the evening (e.g., between 6:00 PM and 11:00 PM), and at a significantly reduced interval during sleeping hours (e.g., between 11:00 PM and 7:00 AM) based on the expected usage 408. As another example, the transmitter controller 410 may cause the transmitter 308 to emit the sound waves 380 via the transducer 310 using the elapsed time 410 since a previous triggering event (e.g., detection of stylus movement). To illustrate, the sound waves 380 may be emitted at frequent intervals when the elapsed time 410 after the previous triggering event satisfies a first threshold (not shown), at a reduced frequency when the elapsed time 410 after the previous triggering event satisfies a second threshold (not shown), and at a significantly reduced interval when the elapsed time 410 after the previous triggering event satisfies a third threshold (not shown). For example, the sound waves 380 may be emitted at 200 millisecond (ms) intervals when the elapsed time 410 after the triggering event is ten minutes, at one second intervals when the elapsed time 410 after the triggering event is thirty minutes, and at one minute intervals when the elapsed time 410 after the triggering event is one hour.

When the sound waves 380 are emitted by the transducer 310 according to the transmission schedule 343, the controller 114 may process the signals 151-154 via the signal processing module 430 to detect the movement 140. For example, the movement 140 may be detected based on an amplitude of the signals 151-154 or based on echolocation.

Thus, the controller 114 may incrementally and gradually transition microphones of the microphone array 425 from the active mode to the dormant mode when the signal processing element 230 detects no movement (e.g., no gesture input and no stylus movement). In the dormant mode, the microphone array 425 consumes less power as compared to the active mode. In the dormant mode, the transmitter 308 may cause the transducer 310 to emit the sound waves 380 based on the transmission schedule 343. In the dormant mode, the microphone array 425 may use an echolocation algorithm to detect movement, such as gesture input or stylus movement. When the controller 114 detects gesture input or stylus movement, the controller 114 may transition the microphone array 425 from the dormant mode to the active mode to receive user input via a gesture or via a stylus.

Figure 5:
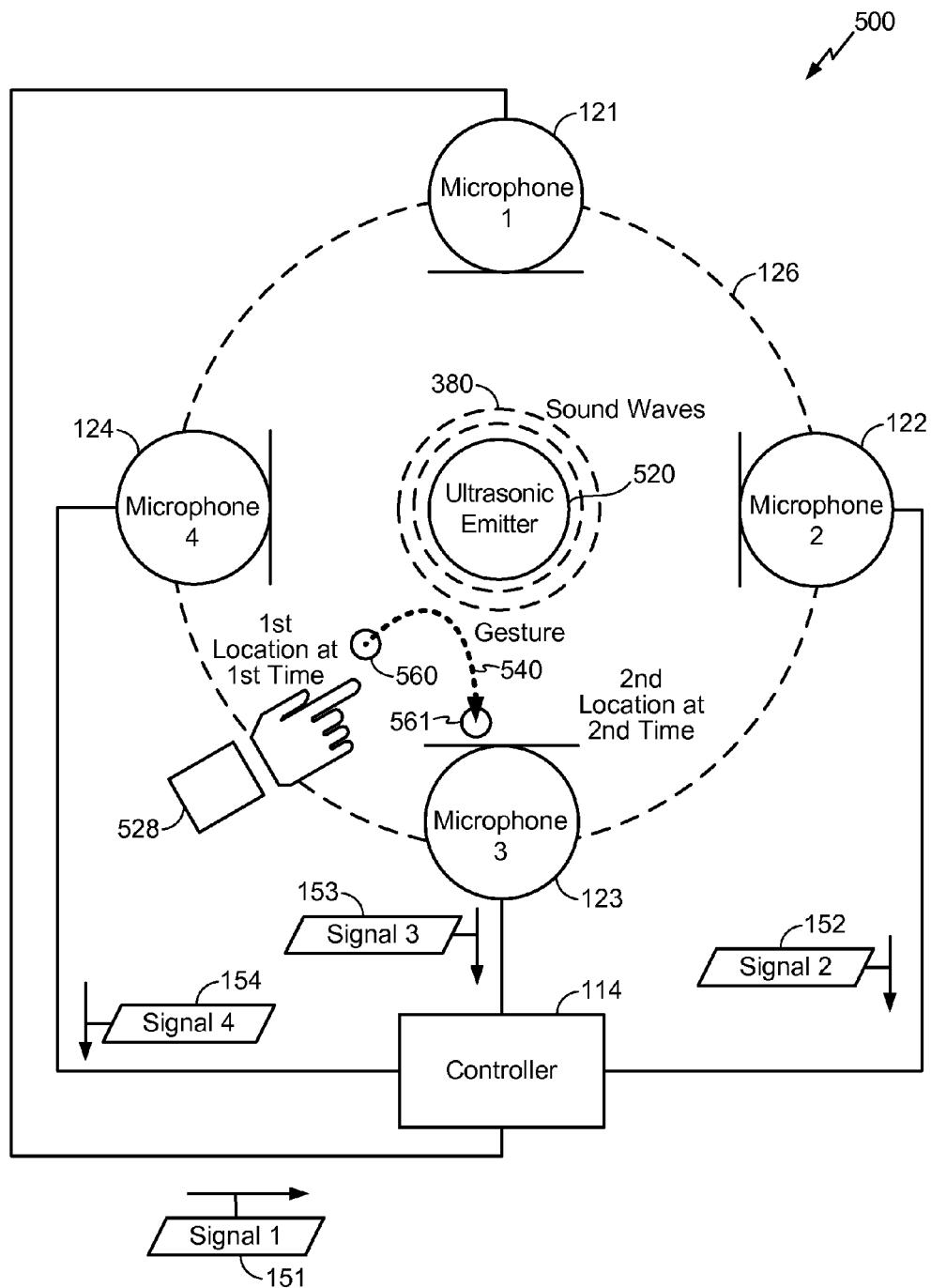
FIG. 5 is a diagram of a fifth embodiment of an apparatus to control monitoring of multiple microphones.

Referring to FIG. 5, a diagram of a fifth embodiment of an apparatus to control monitoring of multiple microphones is depicted and generally designated 500. In the apparatus 500, an ultrasonic emitter 520 may emit the sound waves 380.

In operation, the controller 114 may recognize a gesture 540 performed by an appendage 528 (e.g., a finger) of a user in the zone 126. For example, the controller 114 may determine a first location 560 at a first time of a portion (e.g., a fingertip) of the appendage 528 in the zone 126. The controller 114 may determine a second location 561 at a second time of the portion of the appendage 528. For example, the controller 114 may determine the first location 560 and the second location 561 using echolocation. The controller 114 may use a gesture recognition algorithm to recognize the gesture 540 based on the first location 560 and the second location 561. For example, the gesture recognition algorithm may be used to detect gestures associated with typing at a QWERTY-based keyboard. To illustrate, the user may place a QWERTY-based keyboard template (not shown) in the zone 126. The QWERTY-based keyboard template may be portable and made from paper, cardboard, plastic, rubber, another type of material, or any combination thereof. The user may gesture in the zone 126 as if the user was typing on a QWERTY-based keyboard. The controller 114 may recognize the gestures and display the appropriate characters at the display device (not shown).

Thus, the controller 114 may be used to recognize gestures, such as the gesture 540, made by the appendage 528 of a user in a device into which the apparatus 500 is incorporated.

Figure 6:
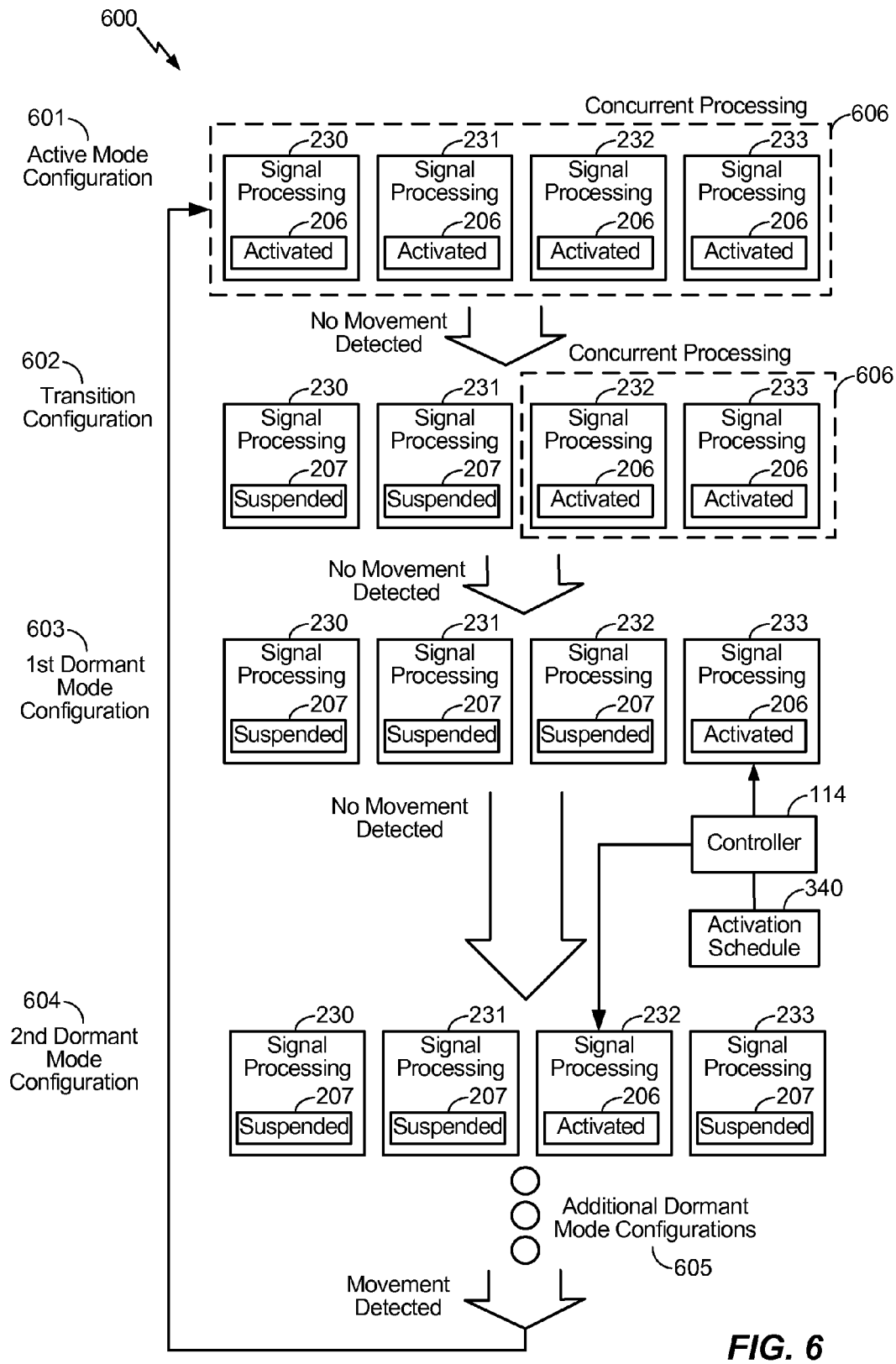
FIG. 6 is a graphical diagram illustrating configurations of the multiple microphones of FIGS. 1-5.

Referring to FIG. 6, a graphical diagram illustrating configurations of the microphones 121-124 of FIGS. 1-3 and 5 and the microphones of the microphone array 425 of FIG. 4, is depicted and designated 600. The graphical diagram 600 illustrates how the signal processing elements 230-233 may be transitioned from an active mode to a dormant mode and from the dormant mode to the active mode.

In an active mode configuration 601, each of the signal processing elements 230-233 may be in the activated 206 mode. In the active mode configuration 601, the signal processing elements 230-233 may be used to perform concurrent processing 606. When no movement is detected, the controller 114 may begin to transition the signal processing elements 230-233 from the active mode to the dormant mode. For example, an echolocation algorithm may be used to detect no movement from the user appendage 528 or from the stylus 128.

During the transition from the active mode to the dormant mode, the signal processing elements 230-233 may be placed in a transition configuration 602. In the transition configuration 602, at least two but not all of the signal processing elements 230-233 may perform the concurrent processing 606. For example, as illustrated in FIG. 6, the signal processing elements 230-231 may be placed in the suspended mode 207 while the signal processing elements 232-233 may remain in the activated mode 206 and may perform the concurrent processing 606.

When the controller 114 detects no movement while the signal processing elements 230-233 are in the transition configuration 602, the signal processing elements 230-233 may be placed in a first dormant mode configuration 603. In the first dormant mode configuration 603, the controller 114 may place one of the signal processing elements 230-233 in the activated mode 206 while placing the remaining signal processing elements 230-233 in the suspended mode 207. For example, as illustrated in FIG. 6, the controller 114 may place the signal processing element 233 in the activated mode 206 and place the signal processing elements 230-232 in the suspended mode 207.

The controller 114 may activate each of the signal processing elements 230-233 in turn based on the activation schedule 340. For example, when the controller 114 detects no movement, the controller 114 may place the signal processing elements 230-233 in a second dormant mode configuration 604. As illustrated in FIG. 6, in the second dormant mode configuration 604, the controller 114 may place the signal processing elements 230-231 and 233 in the suspended mode while placing the signal processing element 232 in the activated mode.

After placing the signal processing elements 230-233 in the second dormant mode configuration 604, the controller 114 may place the signal processing elements 230-233 in additional dormant mode configurations 605. For example, the controller 114 may place each of the signal processing elements 230-233 in the activated mode 206 according to the activation schedule 340. For example, in the additional dormant mode configurations 605, the controller 114 may place the signal processing element 231 in the activated mode 206 while placing the signal processing elements 230, 232-233 in the suspended mode 207 according to the activation schedule 340. As another example, in the additional dormant mode configurations 605, the controller 114 may place the signal processing element 230 in the activated mode 206 while placing the signal processing elements 231-233 in the suspended mode 207 according to the activation schedule 340.

In the dormant mode configurations 603-605, when the controller 114 detects movement (e.g., of a stylus or of a gesture) via the signal processing elements 230-233, the controller 114 may transition the signal processing elements 230-233 from the dormant mode to the active mode configuration 601.

Thus, in the active mode, the signal processing elements 230-233 may perform the concurrent processing 606. When the controller 114 detects no movement, the controller 114 may progressively suspend one or more of the signal processing elements 230-233 while transitioning from the active mode to the dormant mode. By doing so, the controller 114 may reduce power consumption of the signal processing elements 230-233 in the dormant mode. In the dormant mode, the controller 114 may individually activate each of the signal processing elements 230-233 while suspending the remaining signal processing elements 230-233. When the controller 114 detects movement based on one of the signal processing elements 230-233 that has been placed in the activated mode 206, the controller 114 may transition the signal processing elements 230-233 from the dormant mode to the active mode to receive input from a user via a gesture or a stylus.

Figure 7:
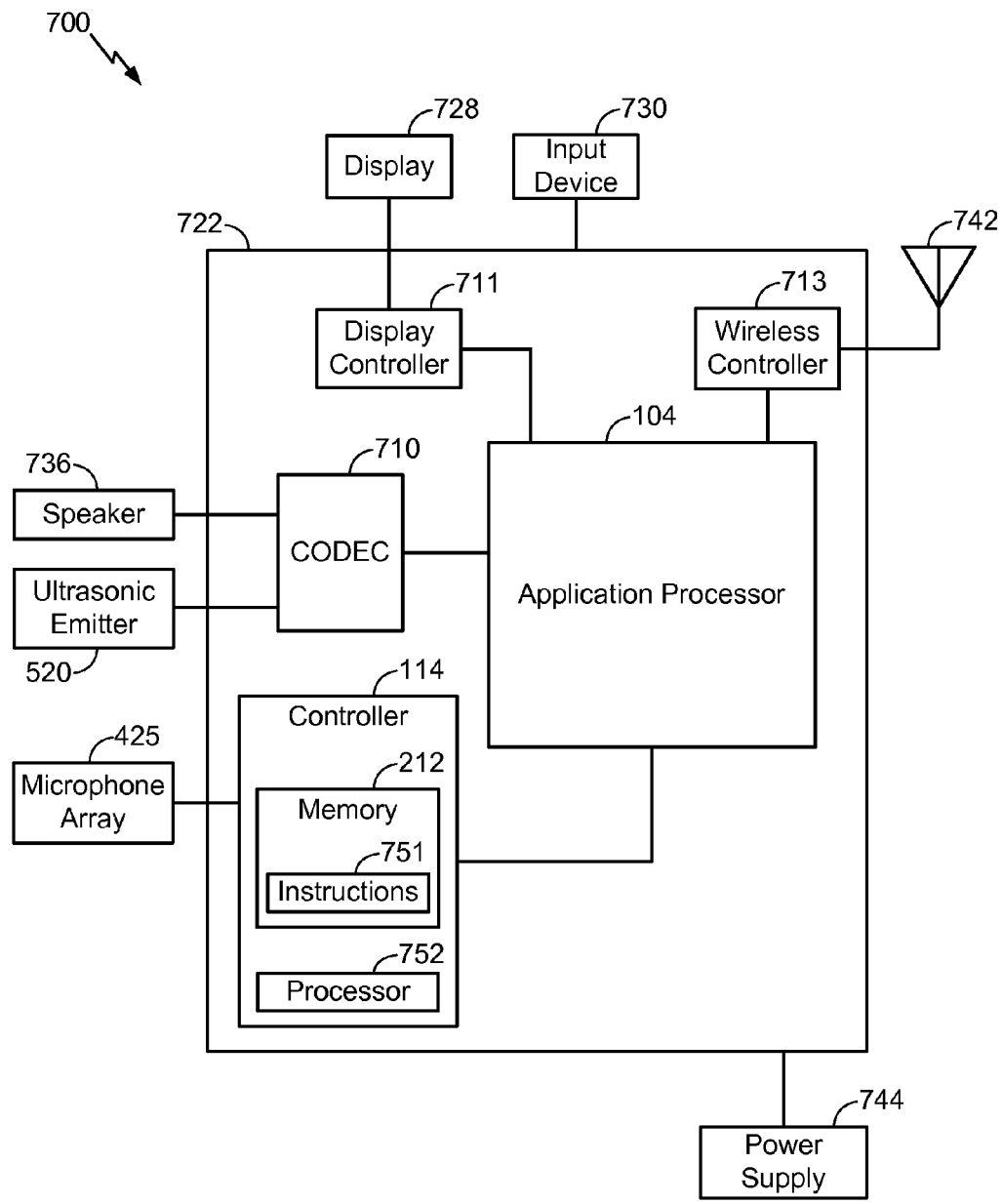
FIG. 7 is a block diagram of an illustrative embodiment of an electronic device that includes multiple microphones.

Referring to FIG. 7, a block diagram of an illustrative embodiment of an electronic device that includes multiple microphones is depicted and designated 700. The device 700 may be an electronic device such as a Personal Digital Assistant (PDA), a wireless mobile device, a computing device, other type of device, or any combination thereof. The device 700 includes the application processor 104.

A coder-decoder (CODEC) 710, a display controller 711, and a wireless controller 713 are coupled to the application processor 104.

The controller 114 includes the memory 212 and a processor 752. The memory 212 may be a tangible non-transitory computer-readable medium for storing processor executable instructions 751 that are executable by the processor 752 to cause the controller 114 to perform any of the methods described herein, such as transitioning individual microphones of the microphone array 425 from the active mode to the dormant mode and from the dormant mode to the active mode.

The display controller 711 is coupled to a display 728. A speaker 736 and the ultrasonic emitter 520 may be coupled to the CODEC 710.

The wireless controller 713 can be coupled to a wireless antenna 742. In a particular embodiment, the display controller 711, the memory 212, the CODEC 710, and the wireless controller 713 are included in a system-in-package or system-on-chip device 722. In a particular embodiment, an input device 730 and a power supply 744 are coupled to the system-on-chip device 722. Moreover, in a particular embodiment, as illustrated in FIG. 7, the display 728, the input device 730, the speaker 736, the microphone array 425, the wireless antenna 742, and the power supply 744 are external to the system-on-chip device 722. However, each of the display 728, the input device 730, the speaker 736, the microphone array 425, the wireless antenna 742, and the power supply 744 can be coupled to a component of the system-on-chip device 722, such as an interface or a controller.

Figure 8:
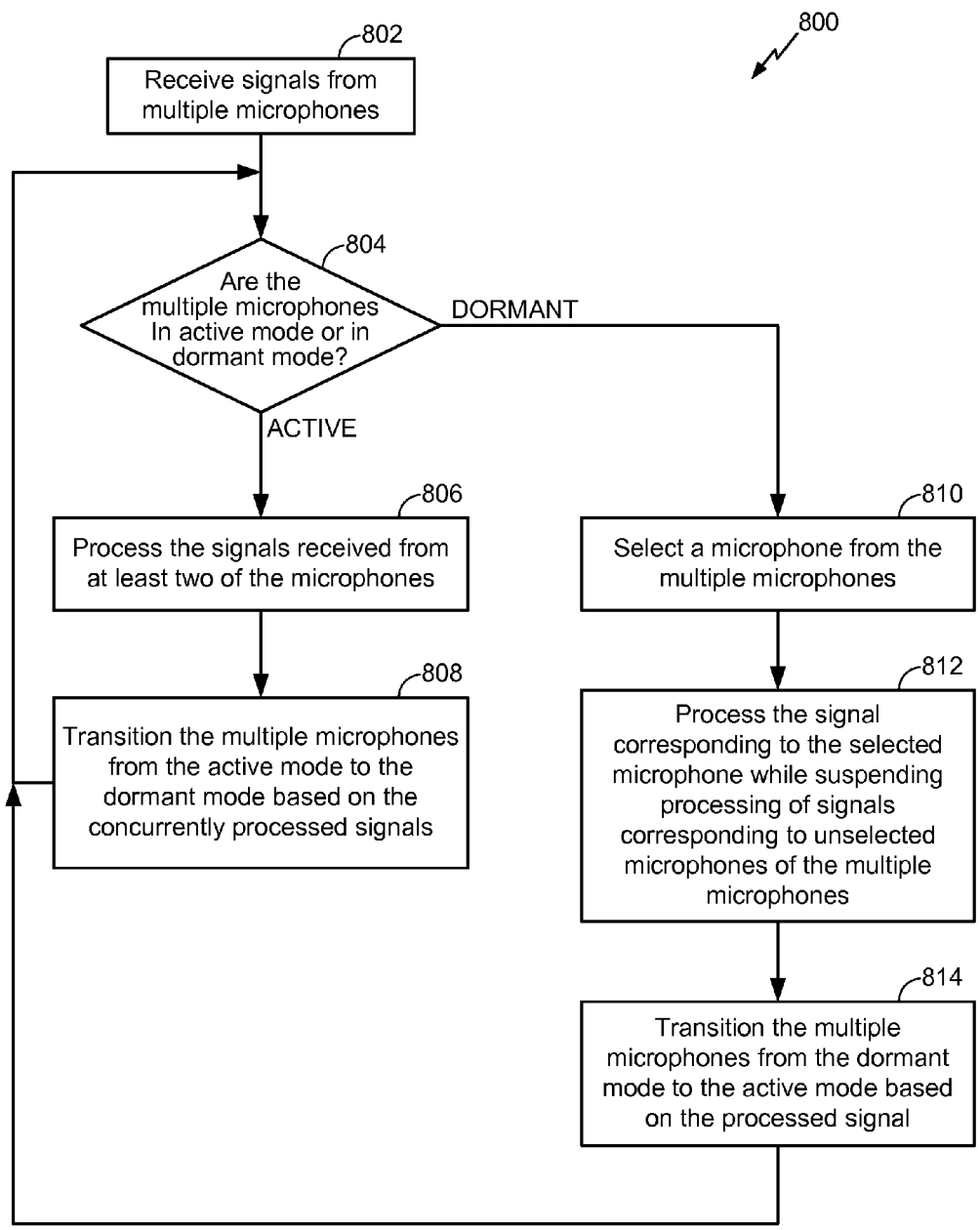
FIG. 8 is a flow diagram of a first illustrative embodiment of a method to control monitoring of multiple microphones.

Referring to FIG. 8, a flow diagram of a method to control monitoring of multiple microphones is depicted and designated 800. The method 800 may be performed by a controller, such as the controller 114 of FIGS. 1-6.

The method 800 begins when the controller receives signals from multiple microphones, at 802. Moving to 804, the controller determines whether the multiple microphones are in an active mode or in a dormant mode.

When the controller determines that the multiple microphones are in the active mode, the controller may process the signals received from at least two of the multiple microphones, at 806. In a particular embodiment, all of the microphones coupled to the controller may be designated for use in the active mode. In another embodiment, less than all of the microphones coupled to the controller may be designated for use in the active mode. The controller may transition the multiple microphones from the active mode to the dormant mode based on the concurrently processed signals, at 808, and the method may proceed to 804. For example, when the controller does not detect movement (e.g., from a hand gesture or from a stylus) based on the concurrently processed signals, the controller may transition the multiple microphones from the active mode to the dormant mode.

When the controller determines that the multiple microphones are in the dormant mode, the controller may select a microphone from the multiple microphones, at 810. Advancing to 812, the controller may process the signal corresponding to the selected microphone while suspending processing of signals corresponding to unselected microphones of the multiple microphones. Continuing to 814, the controller may transition the multiple microphones from the dormant mode to the active mode based on the processed signal, and the method may proceed to 804. For example, when the processed signal indicates that the selected microphone has detected movement (e.g., from a hand gesture or a stylus), the controller may transition the multiple microphones from the dormant mode to the active mode.

Figure 9:
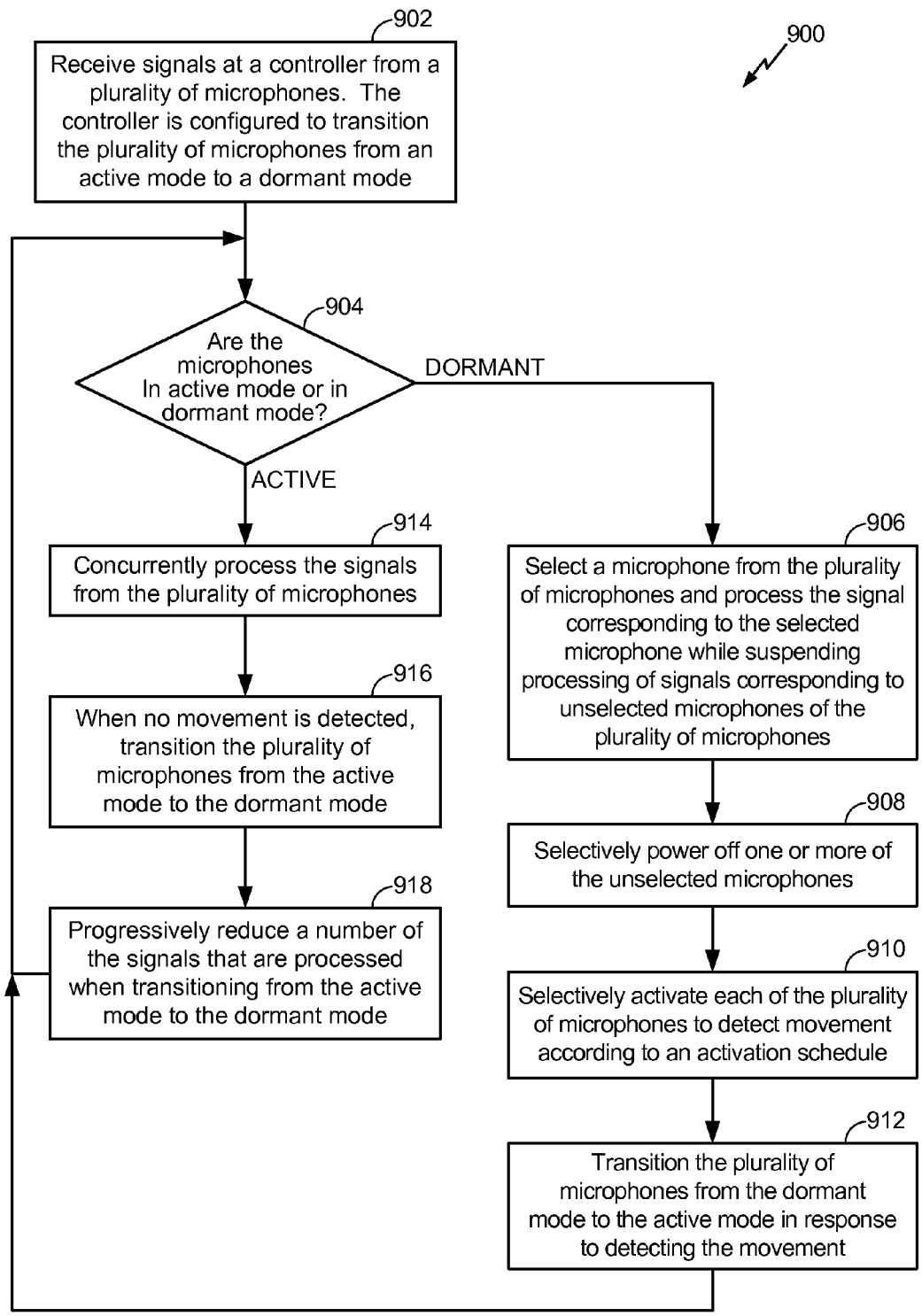
FIG. 9 is a flow diagram of a second illustrative embodiment of a method to control monitoring of multiple microphones.

Referring to FIG. 9, a flow diagram of a method to control monitoring of multiple microphones is depicted and designated 900. The method 900 may be performed by a controller, such as the controller 114 of FIGS. 1-6.

The method 900 begins when the controller receives signals from a plurality of microphones, at 902. The controller may be configured to transition the plurality of microphones from an active mode to a dormant mode. Moving to 904, the controller may determine whether the plurality of microphones is in an active mode or in a dormant mode.

When the controller determines that the multiple microphones are in the dormant mode, the controller may select a microphone from the plurality of microphones and may process the signal corresponding to the selected microphone while suspending processing of signals corresponding to unselected microphones of the plurality of microphones, at 906. Advancing to 908, the controller may selectively power off one or more of the unselected microphones. Continuing to 910, the controller may selectively activate each of the multiple microphones to detect movement according to an activation schedule. Proceeding to 912, the controller may transition the array of microphones from the dormant mode to the active mode in response to detecting the movement, and the method proceeds to 904. For example, when the processed signal indicates that the selected microphone has detected movement (e.g., from a hand gesture or a stylus), the controller may transition the multiple microphones from the dormant mode to the active mode.

When the controller determines that the plurality of microphones are in the active mode, the controller may process signals received from at least two of the plurality of microphones, such as by concurrently processing all of the signals from the plurality of microphones, at 914. When the controller does not detect any movement, the controller may transition the plurality of microphones from the active mode to the dormant mode, at 916. For example, when the controller does not detect movement (e.g., from a hand gesture or from a stylus) based on the concurrently processed signals, the controller may transition the multiple microphones from the active mode to the dormant mode. During the transition from the active mode to the dormant mode, the controller may progressively reduce a number of the signals that are processed, at 918, and the controller may proceed to 904.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a non-transitory storage medium such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus, comprising:
    multiple microphones, wherein the multiple microphones are configurable in one of a first mode and a second mode; and
    a controller configured to receive a signal from each of the multiple microphones and configured to:
        during a first time period in which the multiple microphones are configured in the first mode, perform signal processing responsive to signals received from at least two of the multiple microphones;
        control a transition of the multiple microphones from the first mode to the second mode, wherein a consumption of power of the multiple microphones is less in the second mode than in the first mode; and
        during a second time period in which the multiple microphones are configured in the second mode:
            selectively activate according to a schedule a first microphone, but not all of the multiple microphones, at a first time; and
            selectively activate according to the schedule a second microphone, but not all of the multiple microphones, at a second time that is different than the first time.

2. The apparatus of claim 1, wherein the controller is configured to progressively reduce a number of the signals that are processed concurrently during the transition of the multiple microphones from the first mode to the second mode.

3. The apparatus of claim 1, wherein the controller is configured to power off one or more unselected microphones of the multiple microphones during the second time period.

4. The apparatus of claim 1, further comprising an application processor coupled to the controller.

5. The apparatus of claim 4, wherein the controller is a dedicated microphone controller.

6. The apparatus of claim 1, wherein, during the second time period, the controller is further configured to perform signal processing corresponding to the first microphone, and wherein performing signal processing corresponding to the first microphone includes performing an analog-to-digital conversion of a particular signal received from the first microphone.

7. The apparatus of claim 1, wherein the signal processing includes performing gesture recognition.

8. The apparatus of claim 5, wherein performing the gesture recognition comprises:
    determining a first distance of a portion of a user appendage from at least one microphone of the multiple microphones at a third time;
    determining a second distance of the portion of the user appendage from the at least one microphone at a fourth time; and
    recognizing a particular gesture based on the first distance and the second distance.

9. The apparatus of claim 1, wherein the controller is configured to perform signal processing corresponding to each microphone of the multiple microphones concurrently during the first time period.

10. The apparatus of claim 1, wherein the signal processing includes determining a location of a stylus.

11. The apparatus of claim 10, wherein determining the location of the stylus comprises:
    determining a first distance of a portion of the stylus from at least one microphone of the multiple microphones at a third time;
    determining a second distance of the portion of the stylus from the at least one microphone at a fourth time; and
    determining the location of the stylus based on the first distance and the second distance.

12. The apparatus of claim 1, wherein:
    the first mode and the second mode comprise an active mode and a low-power mode, respectively; and
    when the first microphone is selectively activated during the second time period, the controller is configured to perform signal processing corresponding to the first microphone and to suspend signal processing corresponding to the second microphone.

13. The apparatus of claim 1, wherein, after the first time during the second time period, the controller is configured to selectively deactivate the first microphone.

14. The apparatus of claim 1, wherein, when the first microphone is selectively activated in the second mode, the controller is configured to:
   perform signal processing corresponding to the first microphone; and
   suspend signal processing corresponding to the second microphone.

15. The apparatus of claim 1, wherein, during the second time period, the controller is configured to selectively control one or more microphones of the multiple microphones according to a schedule, and wherein selectively controlling the one or more microphones comprises microphone activation, microphone deactivation, or a combination thereof.

16. The apparatus of claim 1, wherein in the second mode the controller is configured to activate microphones of the multiple microphones one at a time, and wherein, in the second mode, the controller individually powers on and powers off each of the multiple microphones.

17. An apparatus, comprising:
   a transmitter configured to transmit one or more echolocation signals;
   an array of microphones configured to receive the one or more echolocation signals; and
   a controller coupled to receive a signal from each microphone of the array of microphones and configured to control a transition of the array of microphones from a first mode to a second mode,
   wherein the controller is configured to perform signal processing of the signal from each microphone of the array of microphones to detect an event; and
   wherein the controller is configured to control a transmission schedule of the transmitter during an echolocation operation according to an elapsed amount of time since the event, an expected amount of movement to be detected by the controller based on the array of microphones, or a combination thereof.

18. The apparatus of claim 17, wherein the controller is further configured to perform the signal processing of the signal from each microphone of the array of microphones to pre-qualify the event prior to generating an interrupt based on the event.

19. The apparatus of claim 18, wherein pre-qualifying the event includes detecting a direction of a source of the signal from each microphone of the array of microphones.

20. The apparatus of claim 18, wherein pre-qualifying the event includes comparing a portion of one or more of the signal from each microphone of the array of microphones to a stored audio signal.

21. The apparatus of claim 18, wherein pre-qualifying the event includes comparing a magnitude of the signal from each microphone of the array of microphones to a threshold.

22. The apparatus of claim 17, wherein the controller is configured to determine whether the event corresponds to a gesture input.

23. An apparatus comprising:
   an array of microphones; and
   a controller configured to:
      receive a signal from each microphone of the array of microphones;
      control a transition of the array of microphones from a first mode to a second mode, wherein a consumption of power of the array of microphones is less in the second mode than in the first mode; and
      during a time period in which the array of microphones is configured in the second mode:
         selectively activate according to a schedule a first microphone, but not all of the array of microphones, at a first time; and
         selectively activate according to the schedule a second microphone, but not all of the array of microphones, at a second time that is different than the first time.

24. The apparatus of claim 23, wherein, during the time period, the controller is configured to process the signal from each microphone of the array of microphones to perform gesture recognition.

25. The apparatus of claim 24, wherein the controller enables the array of microphones to function as a user interface device, and wherein the gesture recognition includes detecting gestures associated with typing at a QWERTY-based keyboard.

26. The apparatus of claim 24, wherein the gesture recognition is performed to detect a gesture input corresponding to movement of an appendage of a user.

27. The apparatus of claim 23, wherein the controller is configured to process signals received from microphones of the array of microphones to perform surveillance using the array of microphones when the array of microphones is configured in the first mode and when the array of microphones is configured in the second mode.

28. The apparatus of claim 23, wherein the controller is configured to transition the array of microphones from the first mode to the second mode when no movement is detected by the controller.

29. The apparatus of claim 23, wherein the controller is configured to transition the array of microphones from the second mode to the first mode based on the controller detecting movement during the time period.

30. The apparatus of claim 23, wherein the controller is configured to control a transmission schedule of a transmitter communicatively coupled to the controller during an echolocation operation, wherein the controller controls the transmission schedule according to an elapsed time since after an event is detected by the controller.

31. The apparatus of claim 23, wherein the controller is configured to process the signal from each microphone of the array of microphones to perform symbol recognition during another time period in which the array of microphones is configured in the first mode.

32. The apparatus of claim 23, wherein the controller is configured to power off both the first microphone and the second microphone and, during the time period, to sequentially power on the first microphone and the second microphone according to the schedule.

33. The apparatus of claim 23, wherein the second microphone is not active at the first time.

34. A method, comprising:
   receiving signals at a controller from multiple microphones, wherein the controller is configured to transition the multiple microphones from a first mode to a second mode, and wherein a consumption of power of the multiple microphones is less in the second mode than in the first mode;
   when the multiple microphones are in the first mode, processing the signals received from at least two microphones of the multiple microphones; and
   when the multiple microphones are in the second mode:
      selectively activating a first microphone, but not all of the multiple microphones, at a first time; and selectively activating a second microphone, but not all of the multiple microphones, at a second time that is different than the first time,
wherein the first microphone and the second microphone are selectively activated according to a schedule.

35. The method of claim 34, further comprising transitioning the multiple microphones from the first mode to the second mode when no movement is detected by the controller.

36. The method of claim 35, further comprising progressively reducing a number of the signals that are processed when transitioning the multiple microphones from the first mode to the second mode.

37. The method of claim 34, further comprising transitioning the multiple microphones from the second mode to the first mode in response to detecting movement based on at least one microphone of the multiple microphones.

38. The method of claim 34, further comprising, when the multiple microphones are in the second mode, performing an analog-to-digital conversion of a particular signal from the first microphone when the first microphone is selectively activated.

39. The method of claim 34, wherein processing the signal from the multiple microphones comprises at least one of performing gesture recognition and determining a location of a stylus.

40. A non-transitory computer readable storage medium comprising instructions that, when executed by a processor, cause the processor to:
receive a signal at a controller from at least one microphone of a plurality of microphones, wherein the controller is configured to transition the plurality of microphones from a first mode to a second mode, and wherein a consumption of power of the plurality of microphones is less in the second mode than in the first mode;
during a first time period in which the plurality of microphones is configured in the first mode, process the signal from the at least one microphone; and
during a second time period in which the plurality of microphones is configured in the second mode:
selectively activate a first microphone, but not all of the plurality of microphones, at a first time; and
selectively activate a second microphone, but not all of the plurality of microphones, at a second time that is different than the first time,
the first microphone and the second microphone selectively activated according to a schedule.

41. The non-transitory computer readable storage medium of claim 40, wherein the instructions are further executable by the processor to transition the plurality of microphones from the first mode to the second mode when no movement is detected by the controller.

42. The non-transitory computer readable storage medium of claim 41, wherein the instructions are further executable by the processor to progressively reduce a number of the signals that are processed during a particular transition of the plurality of microphones from the first mode to the second mode.

43. The non-transitory computer readable storage medium of claim 41, wherein the instructions are further executable by the processor to selectively power off one or more unselected microphones of the plurality of microphones during the second time period.

44. The non-transitory computer readable storage medium of claim 40, wherein an analog-to-digital conversion of a particular signal received from the first microphone is performed during the second time period.

45. An apparatus, comprising:
a plurality of means for detecting audio activity and for generating electrical signals corresponding to the audio activity;
means for performing signal processing of the electrical signals;
means for controlling a transition of the plurality of means for detecting audio activity from a first mode to a second mode based on the signal processing performed on the electrical signals, wherein a consumption of power of the plurality of means for detecting audio activity is less in the second mode than in the first mode;
first means for selectively activating a first means for detecting audio activity, but not all of the plurality of means for detecting audio activity, at a first time according to a schedule; and
second means for selectively activating a second means for detecting audio activity, but not all of the plurality of means for detecting audio activity, at a second time according to the schedule, the second time different than the first time.

46. The apparatus of claim 45, further comprising means for progressively reducing a number of the signals that are processed concurrently during a particular transition of the plurality of means for detecting audio activity from the first mode to the second mode.

47. The apparatus of claim 45, further comprising means for powering off one or more of the plurality of means for detecting audio activity during a time period associated with the second mode.

48. The apparatus of claim 45, further comprising means for performing an analog-to-digital conversion of the electrical signals.

49. The apparatus of claim 45, further comprising means for performing gesture recognition based on the signal processing.

50. The apparatus of claim 45, further comprising means for determining a location of a stylus based on the signal processing.

* * * * *